(12) United States Patent
Haimes (10) Patent No.: US 11,276,117 B2
(45) Date of Patent: Mar. 15, 2022

(54) GENERATING PAYABLES AND RECEIVABLES NETTING PROPOSALS BASED ON HISTORICAL INFORMATION

(71) Applicant: Oracle International Corporation, Redwood Shores, CA (US)

(72) Inventor: David Joseph Haimes, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 743 days.

(21) Appl. No.: 15/665,385

(22) Filed: Jul. 31, 2017

(65) Prior Publication Data

US 2019/0035017 A1     Jan. 31, 2019

(51) Int. Cl.
*G06Q 40/04*     (2012.01)
*G06N 20/00*     (2019.01)

(52) U.S. Cl.
CPC ............. *G06Q 40/04* (2013.01); *G06N 20/00* (2019.01)

(58) Field of Classification Search
CPC ............................... G06Q 40/04; G06N 20/00
USPC ........................................................ 705/37
See application file for complete search history.

(56) References Cited

U.S. PATENT DOCUMENTS

| | | | | |
|---|---|---|---|---|
| 7,778,914 B1 * | 8/2010 | Wilce | ...................... | G06Q 40/04 |
| | | | | 705/37 |
| 8,024,259 B1 * | 9/2011 | Wilce | ...................... | G06Q 40/04 |
| | | | | 705/37 |
| 2002/0188560 A1 * | 12/2002 | Kawashima | ........... | G06Q 20/10 |
| | | | | 705/40 |
| 2003/0046194 A1 * | 3/2003 | McClendon, III | ..... | G06Q 40/02 |
| | | | | 705/30 |
| 2004/0039689 A1 | 2/2004 | Penney et al. | | |
| 2007/0061260 A1 * | 3/2007 | deGroeve | .............. | G06Q 40/12 |
| | | | | 705/44 |
| 2014/0188674 A1 * | 7/2014 | Carrera Astigarraga | .................... | |
| | | | | G06Q 40/12 |
| | | | | 705/30 |

(Continued)

OTHER PUBLICATIONS

Treasury Matters Blog, What is multilateral netting: and why you can't go another day without it. May 22, 2015, Bellin.com. pp. 1-6. (Year: 2015).*

(Continued)

*Primary Examiner* — Benjamin S Brindley
(74) *Attorney, Agent, or Firm* — Invoke (57) ABSTRACT

Operations include generating proposals for accounts payable and accounts receivable netting across multiple trading partners. A netting proposal system uses a machine learning model to generate netting proposals that are likely to be approved by the respective trading partners. The netting proposal system identifies characteristics of attributes of previously accepted netting proposals. Candidate attributes, with the same characteristics of attributes of previously accepted netting proposals, are selected for a new netting proposal. The netting proposal system further identifies characteristics of attributes of previously rejected netting proposals. Candidate attributes, without the same characteristics of attributes of previously rejected netting proposals, are selected for the new netting proposal. Furthermore, candidate attributes, with the same characteristics of attributes of previously rejected netting proposals, are not selected for the new netting proposal.

17 Claims, 5 Drawing Sheets

(56) References Cited

U.S. PATENT DOCUMENTS

| | | | | |
|---|---|---|---|---|
| 2015/0012382 A1* | 1/2015 | Ceribelli | ............ | G06Q 30/0609 |
| | | | | 705/26.35 |
| 2015/0142545 A1* | 5/2015 | Ceribelli | ............ | G06Q 30/0222 |
| | | | | 705/14.23 |
| 2016/0125486 A1* | 5/2016 | Kasai | ..................... | G06Q 30/04 |
| | | | | 705/40 |
| 2016/0217406 A1* | 7/2016 | Najmi | .............. | G06Q 10/06315 |
| 2017/0221066 A1* | 8/2017 | Ledford | ............... | G06Q 20/407 |
| 2018/0357559 A1* | 12/2018 | Truong | ................ | G06N 3/0454 |

OTHER PUBLICATIONS

Oracle Techno & Functional. "AP & AR Netting Setups In R12." Orafinaappsetups.blogspot.in. Sep. 2, 2016. pp. 1-18.

Treasury Matters Blog. "What is multilateral netting and why you can't go another day without it." Bellin.com. May 22, 2016. pp. 1-6.

AWS Billing. "Paying Bills for Multiple Accounts Using Consolidated Billing." Amazon.com Sep. 2, 2016. pp. 1-3.

Collection Automation. "YayPay Collections Automation". Yaypay.com. Aug. 31, 2016. pp. 1-5.

SCN. "Netting of Payables and Receivables." SCN.com. Sep. 1, 2016. pp. 1-21.

\* cited by examiner

GENERATING PAYABLES AND RECEIVABLES NETTING PROPOSALS BASED ON HISTORICAL INFORMATION

TECHNICAL FIELD

The present disclosure relates to netting accounts payable (also referred to herein as "payables") and accounts receivable (also referred to herein as "receivables"). In particular, the present disclosure relates to generating payables and receivables netting proposals based on historical information.

BACKGROUND

Netting is the process of offsetting the value of multiple invoices, or payments due to be exchanged between trading partners. Netting may be used to partially or fully cancel out an amount to be paid or received. In its simplest form, if Joe owes Mary $40 and Mary owes Joe $40, Joe and Mary can net their debts. Subsequent to netting, Joe owes Mary $0 and Mary owes Joe $0. Netting may, however, involve thousands of individual invoices and complex calculations. Netting generally requires the parties to come to an agreement. Netting may be performed subsequent to the parties being presented with, and accepting, a proposal detailing the invoices to be included in a netting proposal.

Machine learning is a method of building an analytical model. Machine learning utilizes algorithms which iteratively learn from data. A machine learning model can be trained with data to create a model that accurately predicts the future behavior of a system. A machine learning model can model complex patterns in a system without the need for data about where a pattern is expected or what causes a pattern to develop.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. PAYABLES AND RECEIVABLES NETTING
3. NETTING PROPOSAL SYSTEM
4. NETTING PROPOSAL OPERATIONS
   4.1 GENERATING A NETTING PROPOSAL
   4.2 MACHINE LEARNING MODEL
5. EXAMPLE EMBODIMENT
6. MISCELLANEOUS; EXTENSIONS
7. HARDWARE OVERVIEW

1. General Overview

One or more embodiments include generating proposals for accounts payable and accounts receivable netting across multiple trading partners. A netting proposal system uses a machine learning model to generate netting proposals that are likely to be approved by the respective trading partners. The netting proposal system identifies characteristics of attributes of previously accepted netting proposals. Candidate attributes, with the same characteristics of attributes of previously accepted netting proposals, are selected for a new netting proposal. The netting proposal system further identifies characteristics of attributes of previously rejected netting proposals. Candidate attributes, without the same characteristics of attributes of previously rejected netting proposals, are selected for the new netting proposal. Furthermore, candidate attributes, with the same characteristics of attributes of previously rejected netting proposals, are not selected for the new netting proposal.

One or more embodiments described in this Specification and/or recited in the claims may not be included in this General Overview section.

2. Payables and Receivables Netting

Figure 1A:
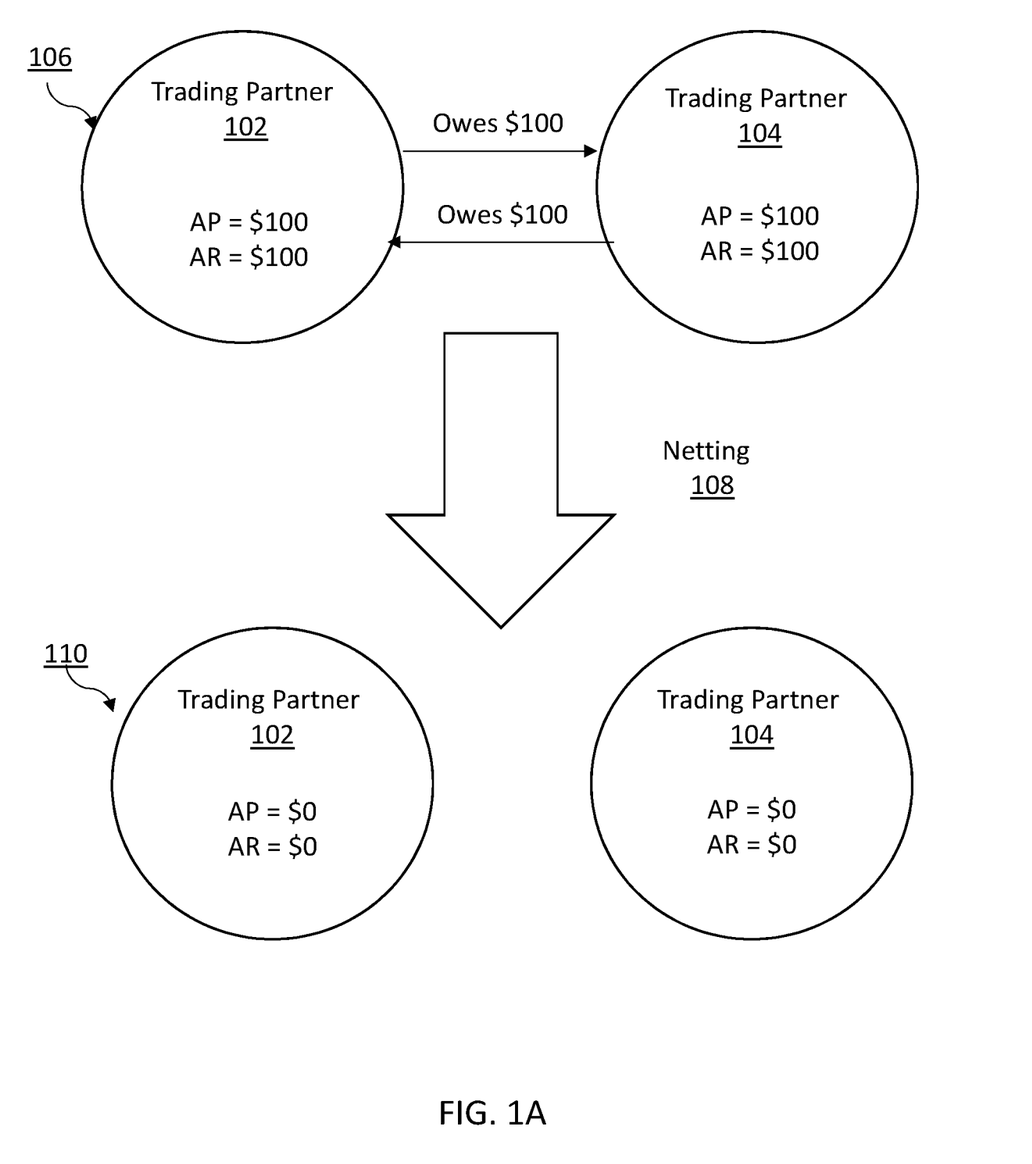
FIG. 1A illustrates a simple two-party netting in accordance with one or more embodiments.

FIG. 1A illustrates a simple example of netting involving two trading partners in accordance with one or more embodiments. Operations described below with respect to FIG. 1A are over-simplified to explain the basic concept of netting. Operations described below may be rearranged, omitted, or modified. Operations, not described below, may be added.

FIG. 1A illustrates two states. State 106 is an initial state prior to application of netting. State 110 is a second state subsequent to application of a netting procedure 108. In the initial state, trading partner 102 owes trading partner 104 $100. Trading partner 104 owes trading partner 102 $100. Trading partner 102 has accounts payable (abbreviated as "AP" herein) totaling $100. The accounts payable for trading partner 102 corresponds to the $100 owed to trading partner 104. Trading partner 102 has accounts receivable (abbreviated as "AR" herein) totaling $100. The accounts receivable for trading partner 102 corresponds to the $100 due to trading partner 102 from trading partner 104. Trading partner 104 has accounts payable totaling $100. The accounts payable for trading partner 104 corresponds to the $100 owed by trading partner 104 to trading partner 102. Trading partner 104 has accounts receivable totaling $100. The accounts receivable for trading partner 104 corresponds to the $100 due to trading partner 104 from trading partner 102.

Resolution of the accounts payable and accounts receivable, for each of the trading partners, via monetary payments would require two payments to be made and processed. Trading partner 102 would need to make a payment of $100 to trading partner 104. Trading partner 104 would need to make a payment of $100 to trading partner 102. A total amount of $200 would have to be exchanged.

Instead of resolution via monetary payments, resolution is achieved via netting (108). To apply netting (108), the accounts payable for a particular trading partner is used to offset the accounts receivable for that trading partner. Specifically, the accounts payable of $100 for trading partner 102 is used to offset the accounts receivable of $100 for the trading partner 102. As a result of the netting, trading partner 102 has an accounts receivable of $0 and an accounts payable of $0. Similarly, the accounts payable of $100 for trading partner 104 is used to offset the accounts receivable of $100 for the trading partner 104. As a result of the netting, trading partner 104 as an accounts receivable of $0 and an accounts payable of $0. Resolution of the accounts payable and accounts receivable, for each of the trading partners, via netting requires no payments to be made or processed. Resolution of the accounts payable and accounts receivable, for each of the trading partners, via netting requires no monetary funds to be exchanged.

Netting may be used to partially reduce both the accounts payable and the accounts receivable, rather than fully resolve the accounts payable and accounts receivable. As an example, Joe owes Suzy $100 and Suzy owes Joe $10. Joe and Suzy may agree to apply netting to (a) reduce the amount Joe owes to Suzy by $10 and (b) reduce the amount Suzy owes to Joe by $10. Subsequent to netting, Joe owes Suzy $90 and Suzy owes Joe $0.

Netting reduces the number of transactions required and the amount of money to be exchanged. Netting can save the trading partners processing costs, bank fees, and time. Netting can also save resources of a financial service provider that would be required to process multiple transactions.

Figure 1B:
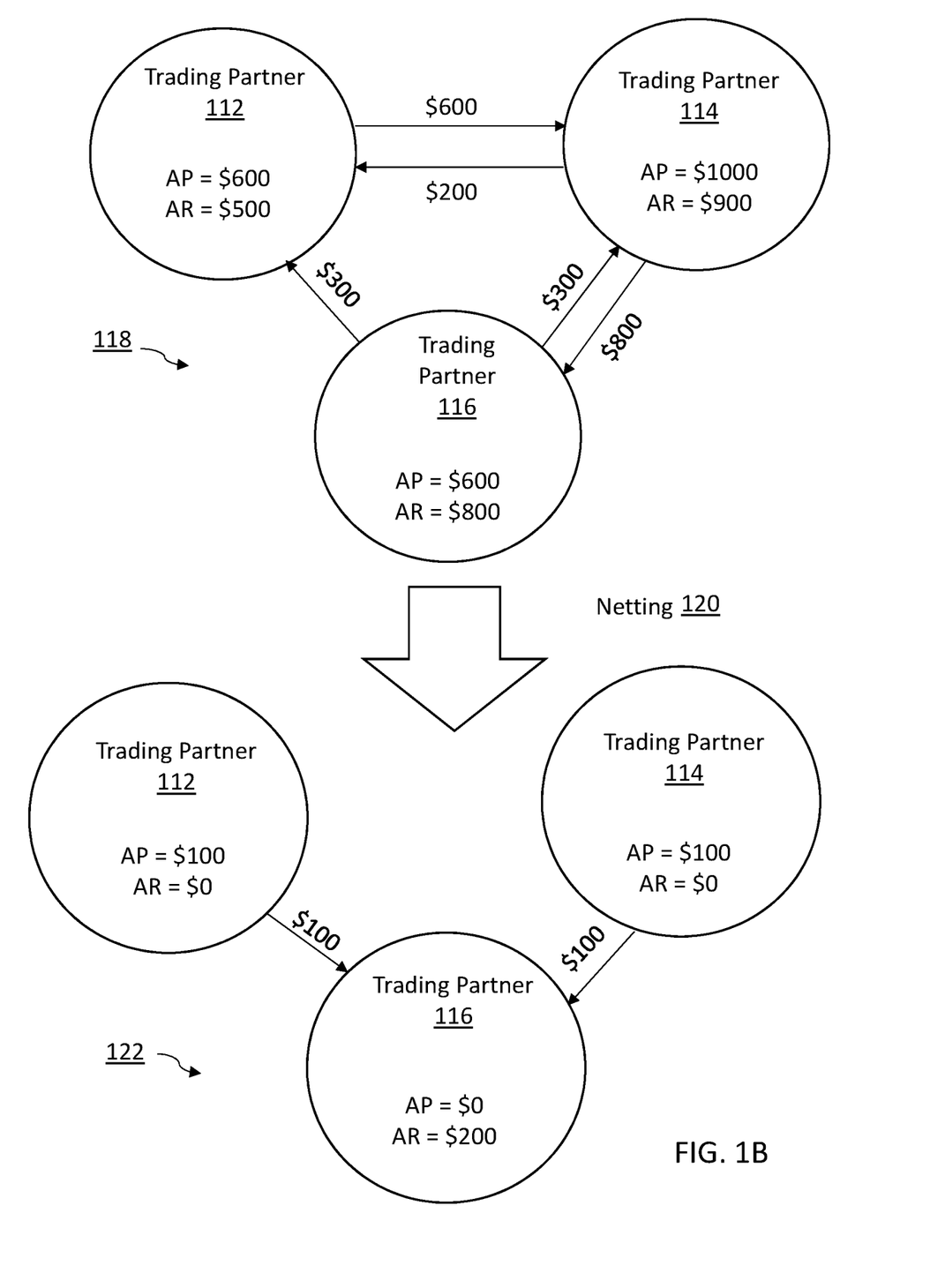
FIG. 1B illustrates a simple three-party netting in accordance with one or more embodiments.

FIG. 1B illustrates netting between three trading partners in accordance with one or more embodiments. FIG. 1B illustrates two states. State 118 is an initial state prior to the application of netting. State 122 is a second state subsequent to the application of a netting procedure 120. In the initial state, trading partner 112 owes trading partner 114 $600. Trading partner 114 owes trading partner 112 $200. Trading partner 114 owes trading partner 116 $800. Trading partner 116 owes trading partner 112 $300. Trading partner 116 owes trading partner 114 $300.

Trading partner 112 has accounts payable totaling $600. The accounts payable for trading partner 112 corresponds to the $600 owed to trading partner 114. Trading partner 112 has accounts receivable totaling $500. The accounts receivable for trading partner 112 corresponds to the $200 due from trading partner 114 plus the $300 due from trading partner 116. Trading partner 114 has accounts payable totaling $1000. The accounts payable for trading partner 114 corresponds to the $200 owed to trading partner 112 plus the $800 owed to trading partner 116. Trading partner 114 has accounts receivable totaling $900. The accounts receivable for trading partner 114 corresponds to the $600 due from trading partner 112 plus the $300 due from trading partner 116. Trading partner 116 has accounts payable totaling $600. The accounts payable for trading partner 116 corresponds to the $300 owed to trading partner 112 plus the $300 owed to trading partner 112. Trading partner 116 has accounts receivable totaling $800. The accounts receivable for trading partner 116 corresponds to the $800 due from trading partner 114.

Resolution of the accounts payable and accounts receivable, for each of the trading partners, via monetary payments would require five payments to be made and processed. Trading partner 112 would need to make a payment of $600 to trading partner 114. Trading partner 114 would need to make a payment of $200 to trading partner 112, and make a payment of $800 to trading partner 116. Trading partner would need to make a payment of $300 to trading partner 112, and make a payment of $300 to trading partner 116. A total amount of $2,200 would have to be exchanged.

Netting (120) is applied, to reduce the amount and quantity of monetary payments required. To apply netting (120), accounts payable for a particular trading partner is used to offset the accounts receivable for that trading partner. Specifically, the accounts receivable of $500 for trading partner 112 is used to partially offset the accounts payable of $600 for trading partner 112. The accounts receivable of $900 for trading partner 114 is used to partially offset the accounts payable of $1000 for trading partner 114. The accounts payable of $600 for trading partner 116 is used to partially offset the accounts receivable of $800 for trading partner 116. As a result of the netting, trading partner 112 has an accounts receivable of $0 and an accounts payable of $100. Trading partner 114 has an accounts receivable of $0 and an accounts payable of $100. Trading partner 116 has an accounts receivable of $200 and an accounts payable of $0.

Netting the accounts receivable and the accounts payable for trading partner 112 yields $600-$500=$100 net payable. Netting the accounts payable and the accounts receivable for trading partner 114 yields $1000-$900=$100 net payable. Netting the accounts payable and the accounts receivable for trading partner 116 yields $200 net receivable.

Resolution of the accounts payable and accounts receivable, for each of the trading partners, via netting requires 2 payments to be made and processed. The number of payments is reduced from 5 payments to 2 payments. Resolution of the accounts payable and accounts receivable, for each of the trading partners via netting requires an exchange of a total of $200. The monetary funds to be exchanged is reduced from $2,200 to $200.

In these simplified examples, it is relatively easy to manually compute the netting. However, a trading group may include thousands of trading partners and thousands of transactions. With a large trading group, the netting calculations become increasingly complex. Further, when netting invoices for a large trading group, it becomes increasingly difficult to predict whether one trading partner will be amenable to a particular netting proposal.

3. Netting Proposal System

Figure 2:
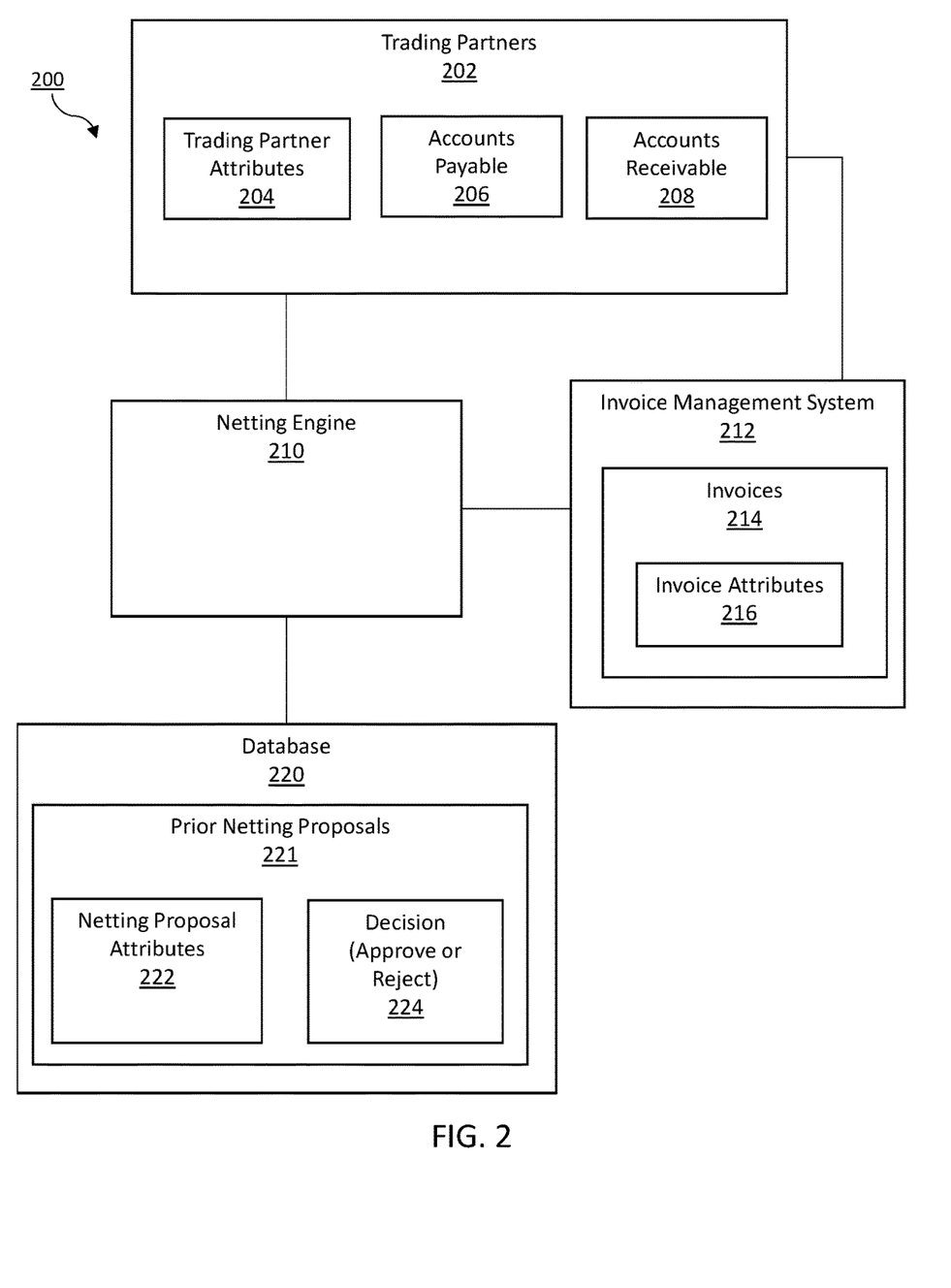
FIG. 2 illustrates a netting proposal system in accordance with one or more embodiments.

FIG. 2 illustrates a netting proposal system 200 in accordance with one or more embodiments. The netting proposal system 200 is a system for generating a netting proposal, based on a likelihood that the netting proposal will be approved. The netting proposal system 200 includes trading partners 202, a netting engine 210, an invoice management system 212, and a database 220. In one or more embodiments, the netting proposal system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In one or more embodiments, the trading partners 202 are entities that have completed one or more transactions. The trading partners 202 may be individuals, companies, and/or subdivisions of companies. Thousands of trading partners 202 may manage transactions via a particular invoice management system.

In an embodiment, the accounts payable 206 for a particular trading partner 202 is the total amount that the particular trading partner owes to other trading partners. A trading partner may receive goods or services, and receive an invoice to pay for the goods or services later. The accounts payable 206 may be the sum of invoices for a trading partner. For example, Lucky China has three payable invoices outstanding: $400 owed to AT Communications, $100 owed to ABC Restaurant Supply, and $1000 owed to Sacramento Property Management. The sum of the three payable invoices is Lucky China's accounts payable: $1600.

In an embodiment, accounts receivable 208 for a particular trading partner is the total amount owed to the particular trading partner by other trading partners. For example, Lucky China has two receivable invoices outstanding: $50 due from John Smith and $500 due from California Insurance Co. The sum of the two receivable invoices is Lucky China's accounts receivable: $550.

In an embodiment, the trading partner attributes 204 are characteristics of a particular trading partner 202. Some trading partner attributes 204 may be pertinent to whether a trading partner 202 is likely to accept a particular netting proposal. Examples of trading partner attributes 204 include: whether a trading partner has previously opted in for netting, the trading partner's history of approving netting proposals, the trading partner's history of rejecting netting proposals, and the trading partner's accounts payable. The trading partner's accounts payable, if a large amount, may dissuade other trading partners from accepting a netting proposal with that trading partner.

In an embodiment, the invoice management system 212 is a financial management system or application. The invoice management system 212 may store financial data for a plurality of trading partners 202. The invoice management system 212 may be used to pay debts and collect on invoices. The invoice management system 212 may be a cloud-based financial management application.

In an embodiment, the invoice management system 212 stores invoices 214. In an embodiment, an invoice 214 is a record of money owed to, or owed by, a trading partner. An invoice 214 may represent a particular transaction between two trading partners that are users of the invoice management system 212. Alternatively, or additionally, an invoice 214 may represent a transaction between one trading partner that is a user of the invoice management system 212 and another trading partner that is a company that does not use the invoice management system 212. For example, multiple users of an invoice management system may owe money to US Shipping.

In an embodiment, the invoice attributes 216 are characteristics of a particular invoice. Invoice attributes 216 may be used to determine whether a netting proposal including a particular invoice is likely to be approved. Examples of invoice attributes 226 include the amount of the invoice (which may be a dollar amount or a range), the type of goods or services, payment schedules, the age of the invoice, and the tax categorization of the invoice. Another potential invoice attribute 216 is whether the invoice source is electronic or manual. A manual invoice may be ineligible for electronic payment, in which case a netting proposal including the invoice is unlikely to be approved. Invoice attributes 216 may pertain to discounts available for an invoice. Invoice terms often include discounts for early settlement. Discount-related invoice attributes may include a discount available, the amount of discounts to be taken, the amount of discounts not taken, the value of discounts taken, and the value of discounts not taken.

In an embodiment, the netting engine 210 includes software and/or hardware configured to generate and propose a netting proposal. The netting engine 210 may select one or more attribute characteristics, of a candidate attribute, for inclusion in a new netting proposal. The netting engine 210 may implement a machine learning model to identify attribute characteristics, of a candidate attribute, associated with prior netting proposals that were accepted or rejected. Based on an attribute characteristic being associated with a prior netting proposal that was accepted, the netting engine may select the attribute characteristic for inclusion in a new netting proposal. Based on an attribute characteristic being associated with a prior netting proposal that was rejected, the netting engine may select a different attribute characteristic for inclusion in a new netting proposal. The netting engine 210 may present a new netting proposal to a trading partner for approval or rejection.

In an embodiment, the database 220 corresponds to any local or remote storage device. Access to the database 220 may be restricted and/or secured. In an example, access to the database 220 requires authentication using passwords, certificates, and/or another suitable mechanism. Those skilled in the art will appreciate that elements or various portions of data stored in the database 220 may be distributed and stored in multiple data repositories. In one or more embodiments, the database 220 is flat, hierarchical, network based, relational, dimensional, object modeled, or structured otherwise. In an example, database 220 is maintained as a table of a Structured Query Language (SQL) database and verified against other databases.

In an embodiment, the database 220 stores prior netting proposals 221. The prior netting proposals 221 may be netting proposals previously generated and/or presented by the netting engine 210. Alternatively or additionally, the prior netting proposals 221 may be netting proposals generated without the netting engine, and stored to the database 220 to be used in assessing new netting proposals. For example, a trading partner may provide a list of netting proposals that the trading partner approved in the past.

In an embodiment, the database 220 stores netting proposal attributes 222. Netting proposal attributes 222 describe a netting proposal as a whole. Examples of netting proposal attributes 222 include the number of trading partners in the netting proposal, the total number of invoices in the netting proposal, the total value of invoices in the netting proposal, the total amount of discounts taken for the respective invoices, and the average age of invoices in the netting proposal.

In an embodiment, the database 220 stores a decision 224 corresponding to each prior netting proposal 221. A decision 224 may be approve or reject. The decision 224 corresponds to a decision made by a trading partner when presented with a particular prior netting proposal 221. If the trading partner approved the prior netting proposal, then the decision 224 is approve. If the trading partner rejected, or otherwise did not approve, the prior netting proposal, then the decision 224 is reject.

4. Netting Proposal Operations 4.1 Generating a Netting Proposal

Figure 3:
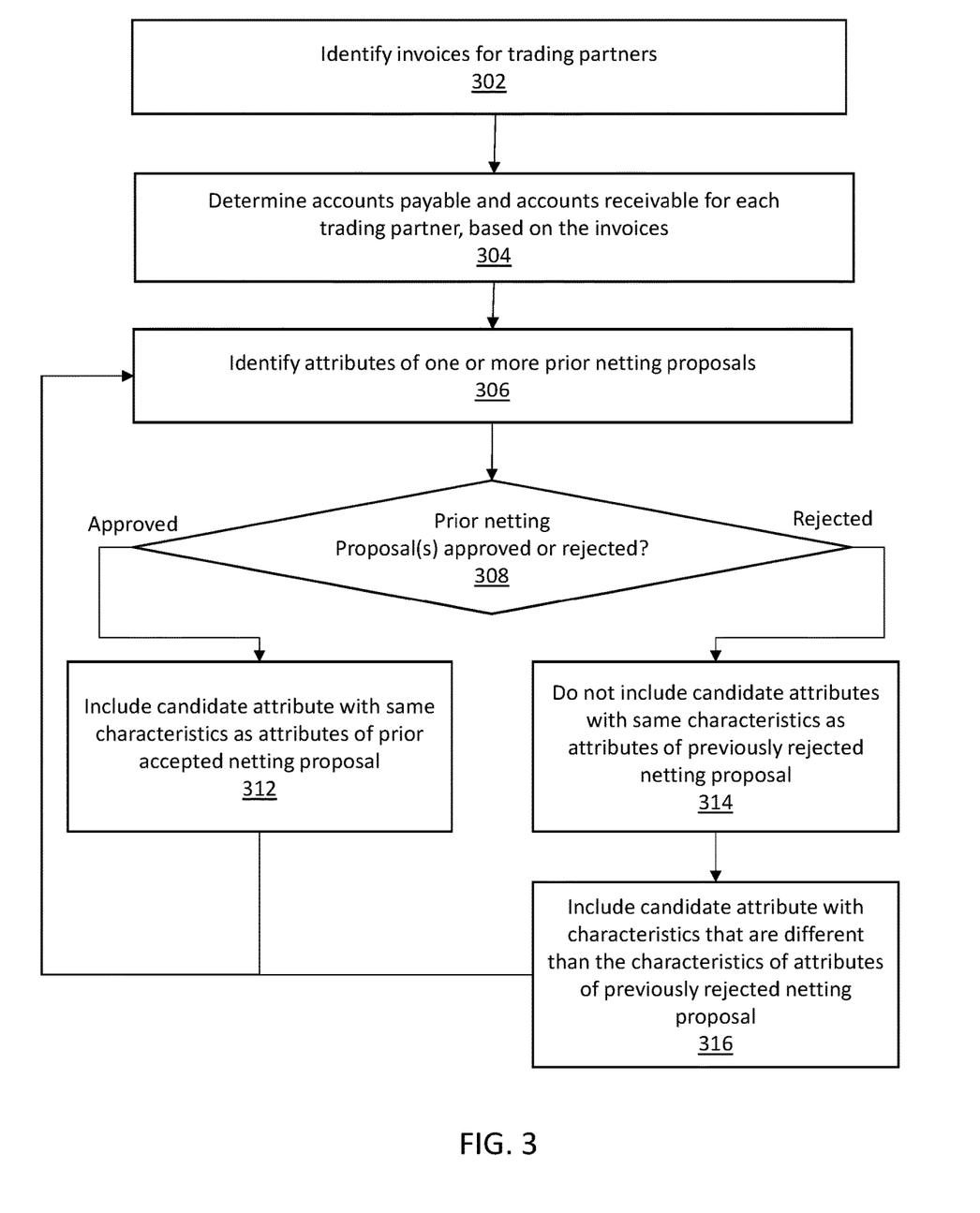
FIG. 3 illustrates an example set of operations for generating a netting proposal in accordance with one or more embodiments.

FIG. 3 illustrates an example set of operations for generating a netting proposal, in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In an embodiment, the netting engine identifies invoices for trading partners (Operation 302). The netting engine identifies a candidate set of invoices for potential inclusion in a new netting proposal. The netting engine may query an invoice management system to identify outstanding invoices. The netting engine may identify invoices for a particular trading partner.

In an embodiment, the netting engine determines the accounts receivable and accounts payable for each trading partner, based on the invoices (Operation 304). The netting engine may sum invoices for a trading partner to obtain an accounts receivable amount and an accounts payable amount for the trading partner. For example, Happy Hotel is a trading partner with five candidate invoices for a new netting proposal. Happy Hotel has the following outstanding invoices: $150 due from Bob Smith, $577 due from Sally Jones, $1,345 due from H. Roller. Furthermore, Happy Hotel has received an invoice for $999, due to Cleaning Supply Co. The netting engine computes the accounts receivable by summing the amount owed to Happy Hotel. The accounts receivable for Happy Hotel is equal to the $150 due from Bob Smith plus the $577 due from Sally Jones plus the $1,345 due from H. Roller. Happy Hotel has $2072 accounts receivable. The netting engine computes the accounts payable, which is the total amount owed by Happy Hotel. The accounts payable for Happy Hotel is equal to the $999 due to Cleaning Supply Co. Happy Hotel has $999 accounts payable.

In an embodiment, the netting engine identifies attributes of one or more prior netting proposals that have been approved or rejected by respective trading partners (Operation 306). The attributes for the prior netting proposals include attributes of the netting proposal as a whole (e.g., a net reduction in AR and AP for a trading partner, the set of trading partners involved, etc.). The attributes for the prior netting proposals may include attributes of individual invoices corresponding to a netting proposal. The netting engine may identify an attribute of one or more prior netting proposals by querying the database and/or inventory management system.

The netting engine may determine an attribute boundary (also referred to herein as "attribute characteristics") associated with a candidate attribute of a netting proposal. For example, if a candidate attribute is an age of a particular invoice, the attribute boundary or attribute characteristics may be defined as an age range which includes the age of the particular invoice. The netting engine may further identify an evaluation set of prior netting proposals with attributes that have the same characteristics as the candidate attribute that may be included in a new proposal. In an example, various combinations of candidate attributes, of a new proposal, are used to identify prior netting proposals. The greater the number of shared attributes between a prior netting proposal and a combination of candidate attributes for a new proposal, the more likely it is that the prior netting proposal's approval/rejection decision will match the new proposal's approval/rejection decision.

In an embodiment, the netting engine determines whether the prior netting proposal(s) were approved or rejected (Operation 308). The netting engine may query the database for a decision (approve or reject) for each netting proposal. The netting engine may determine detailed information about the approval/rejection history of the prior netting proposal(s). The netting engine may determine information such as percentages of approval/rejection for each set of proposals with a particular combination of attributes.

In an embodiment, the netting engine includes candidate attributes with the same characteristics as attributes of previously accepted netting proposals in the new netting proposal (Operation 312). Many implementation variations are possible for selecting candidate attributes, for a new proposal, with the same characteristics as attributes of previously accepted netting proposals. In one example, the netting engine determines that a threshold percentage (e.g., 80%) of prior netting proposals, with an attribute that has the same characteristics as the candidate attribute, have been approved. Based on this determination, the netting engine includes the candidate attribute in the new netting proposal.

In an embodiment, the netting engine evaluates sets of approved netting proposals and sets of rejected netting proposals to identify attribute patterns. The netting engine may identify characteristics of attributes commonly associated with approved netting proposals. The netting engine may select candidate attributes for a new netting proposal that have similar characteristics as the attributes commonly associated with approved netting proposals.

As an example, the netting engine may determine that 85% of rejected netting proposals have twenty or more trading partners. The netting engine may further determine that 75% of approved netting proposals have less than twenty trading partners. The netting engine may determine that a correlation between exists between the number of trading partners and the approval rate of netting proposals. Specifically, as the number of trading partners increases, the likelihood of approval decreases. Furthermore, the netting engine identifies a pattern indicating a significant decrease in approval for netting proposals with twenty or more trading partners. Based on the pattern, the netting engine generates netting proposals that involve less than twenty trading partners.

Different trading partners may differently decide on whether or not to approve a netting proposal. In an embodiment, the netting engine determines and utilizes characteristics of each trading partner as indicated by approvals and rejections of prior netting proposals. The netting engine generates netting proposals based on the different characteristics of the trading partners. As an example, decisions on prior netting proposals indicate that a first trading partner does not consider an amount by which the AR and AP are to be reduced by a netting proposal. Specifically, there is no correlation between amount and approval/rejection decision by the first trading partner. Decisions on prior netting proposals further indicate that two additional trading partners only approve netting proposals in which the net reduction in AR and AP for that trading partner is less than $10,000. Based on the trading partner characteristics, the netting engine generates netting proposals which reduce AR and AP by a maximum of $10,000 for each of the two additional trading partners. The netting engine does not consider any limit on the AR and AP reduction for the first trading partner.

In an embodiment, the netting engine generates netting proposals based on characteristics of invoice attributes of previously accepted netting proposals. The netting engine may determine whether or not to include a particular invoice in a new netting proposal based on an analysis of a transaction associated with the particular invoice. For example, the netting engine determines that the amount corresponding to the transaction is $300, and the type of goods corresponding to the transaction is food. Based on prior netting proposals, the netting engine determines that netting proposals with $300 invoices have been approved 60% of the time. The netting engine further determines that netting proposals with invoices for food have been approved 70% of the time. Based on the 60% approval associated with one attribute characteristic and the 70% approval associated with another attribute characteristic, the netting engine determines that a netting proposal with the invoice is likely to be approved (e.g., 65% chance of approval may be computed based on average of approval percentages 60% and 70% associated with two attributes). Accordingly, the netting engine selects the invoice for inclusion in the netting proposal.

In an embodiment, subsequent to adding a set of invoices to a new netting proposal, the netting engine determines the characteristics of the netting proposal attributes of the new netting proposal as a whole. The netting engine evaluates a likelihood of approval of the new netting proposal based on the characteristics of the netting proposal attributes. As an example, the netting engine determines a total number of invoices to be settled with the new netting proposal. The netting engine compares (a) the total number of invoices to be settled for the new netting proposal to (b) the total number of invoices to be settled by previously approved netting proposals. If the total number of invoices to be settled for the new netting proposal is similar in range to (or within a range of) the total number of invoices settled by previously approved netting proposals, then the new netting proposal is acceptable. If the total number of invoices to be settled for the new netting proposal is significantly different (e.g., difference of threshold value) from the total number of invoices settled by previously approved netting approvals, then the new proposal is not acceptable. The new proposal may be modified by removing or adding invoices such that a number of invoices to be settled by the new proposal is within a range of the number of invoices settled by previously approved netting proposals.

In an embodiment, the netting engine may determine candidate attribute characteristics for multiple attributes using a model function. The netting engine may, at some initial time, generate a function for candidate attribute selection (as described in Section 4.2). As an example, the likelihood of approval may be modeled by the function:

$$L = -9 (N_i) + 8 (D_t)$$

, where L is the likelihood of approval of the netting proposal, $N_i$ is the number of invoices included in the netting proposal, and $D_t$ is the number of discounts taken in the netting proposal. The netting engine may use the model function to select attribute characteristics of the candidate attributes number of invoices and number of discounts simultaneously by maximizing the likelihood of approval factor.

In an embodiment, if the prior netting proposal(s) were rejected, then the netting engine does not include candidate attributes with the same characteristics as attributes of the previously rejected netting proposal(s) in the new netting proposal (Operation 314). In an example, the netting engine determines that a trading partner, Company X, has rejected 100% of netting proposals involving trading partners in foreign countries. Based on this determination, the netting engine does not generate any new netting proposals which involve both Company X and trading partners in foreign countries.

The netting engine may refrain from generating netting proposals including trading partners that generally do not approve netting proposals. For example, the netting engine determines that a trading partner, Lucca's Pizzeria has rejected 88% of prior netting proposals. Based on the high percentage of rejections, the netting engine does not include Lucca's Pizzeria in a new netting proposal involving ten other trading partners.

In an embodiment, if the prior netting proposal(s) were rejected, then the netting engine includes a candidate attribute with characteristics that are different than the characteristics of the previously rejected netting proposal (Operation 316). The netting engine may select candidate attribute characteristics to be outside of a range corresponding to previously rejected netting proposals. For example, the netting engine determines that 80% of netting proposals with a total value for corresponding invoices of $20,000 or more were rejected. The netting engine generates a new netting proposal with a total value for corresponding invoices of $19,000.

In an embodiment, the netting engine identifies characteristics for a series of attributes in turn. First, the netting engine identifies characteristics for trading partner attributes which have been part of one or more approved prior netting proposals. The netting engine then determines attribute characteristics for invoice attributes which have been part of one or more approved prior netting proposals. The netting engine then determines attribute characteristics for netting proposal attributes which have been part of one or more approved prior netting proposals. It should be understood that the netting engine may determine attribute characteristics for one or more of invoice attributes, trading partner attributes, and netting proposal attributes, in any order desired.

As an example, the netting engine generates a new netting proposal, based on parameters that have been established using a decision-tree-based machine learning model (as described below in Section 4.2). First, the netting engine identifies outstanding invoices for trading partners. The netting engine identifies 100,000 invoices, for 30,000 trading partners, that could potentially be included in a new netting proposal.

The netting engine determines accounts payable and accounts receivable for each trading partner, based on the invoices. The netting engine sums the amount owed by each of the 30,000 trading partners, to arrive at 30,000 respective accounts payable values. The netting engine sums the amount owed to each of the 30,000 trading partners, to arrive at 30,000 respective accounts receivable values.

The netting engine analyzes potential trading partners to include in the new netting proposal, based on trading partner attributes. The netting engine has established the following parameters for the business object Trading Partner:

TABLE 1

| Trading Partner Attributes | Attribute Values |
| --- | --- |
| Opted in for netting | Yes/No |
| Approved/rejected history | >45% approval/≤45% approval |
| Location | Not North Korea, Iran/North Korea, Iran |
| Outstanding balances | ≤$5,000/>$5,000 |

For each trading partner attribute, the machine learning model has been used to determine the attribute value ranges noted in Table 1. If a trading partner is opted in for netting, then a netting proposal including the trading partner is likely to be approved. If a trading partner has approved more than 45% of prior trading agreements presented to that trading partner, then a netting proposal including the trading partner is likely to be approved. If a trading partner is located in any country but North Korea or Iran, then a netting proposal including the trading partner is likely to be approved. If a trading partner has outstanding balances less than or equal to $5,000, then a netting proposal including the trading partner is likely to be approved.

The netting engine identifies invoices for trading partners, such that a netting proposal including the invoices is likely to be approved. The netting engine selects invoices by evaluating one trading partner attribute at a time. First, the netting engine selects invoices for trading partners who have opted in for netting. Next, the netting engine selects invoices for trading partners based on approval history, location, and outstanding balances. The netting engine selects 9,000 of the 100,000 invoices, based on the invoices being for trading partners with trading partner attributes within the ranges noted in Table 1.

Using the invoices selected based on trading partner attributes, the netting engine analyzes the invoices based on invoice attributes. The netting engine has established the following parameters for the business object Invoices:

TABLE 2

| Invoice Attributes | Attribute Values |
|---|---|
| Amount | ≤$750/>$750 |
| Type of goods or services | Clothing, Insurance, Transportation/Food, Shipping, Office Supplies |
| Discount available | Yes/No |
| Payment schedules | Full/Installment |
| Value of discounts taken | ≤$250/>$250 |
| Value of discounts not taken | >$400/≤$400 |
| Age of invoice | ≥1 year/<1 year |
| Tax categorization | Not tax deductible/Tax deductible |

For each invoice attribute, the machine learning model has been used to determine the attribute value ranges noted in Table 2. If an invoice is for an amount less than or equal to $750, then a netting proposal including the invoice is likely to be approved. If an invoice is for clothing, insurance, or transportation, then a netting proposal including the invoice is likely to be approved. If a discount is available on an invoice, then a netting proposal including the invoice is likely to be approved. If an invoice has payment due in full, rather than on installment, then a netting proposal including the invoice is likely to be approved. If an invoice has discounts taken with a total value less than or equal to $250, then a netting proposal including the invoice is likely to be approved. If an invoice has discounts not taken with a total value greater than $400, then a netting proposal including the invoice is likely to be approved. If the age of an invoice greater than or equal to 1 year, then a netting proposal including the invoice is likely to be approved. If an invoice is for a non-tax-deductible transaction, then a netting proposal including the invoice is likely to be approved.

The netting engine identifies invoices, such that a netting proposal including the invoices is likely to be approved. The netting engine selects invoices by evaluating one invoice partner attribute at a time. First, the netting engine selects invoices with values less than or equal to $750. Next, the netting engine selects invoices based on the type of goods or services, discount available, payment schedules, value of discounts taken, value of discounts not taken, age of invoice, and tax categorization. The netting engine selects 356 of the 9,000 invoices, based on the invoices having invoice attributes within the ranges noted in Table 2.

The netting engine has selected 356 invoices to include in the new netting proposal. The netting engine now analyzes the new netting proposal at the netting proposal level. The netting engine has established the following parameters for the business object Netting Proposal:

TABLE 3

| Netting Proposal Attributes | Attribute Values |
|---|---|
| Total number of invoices | <850/≥850 |
| Total value of invoices | <$66,000/≥$66,000 |
| Average age of invoices | <9 months/≥9 months |

For each netting proposal attribute, the machine learning model has been used to determine the attribute value ranges noted in Table 3. If the total number of invoices in the netting proposal is less than 850, then the netting proposal is likely to be approved. If the total value of invoices in the netting proposal is less than $66,000, then the netting proposal is likely to be approved. If the average age of invoices in the netting proposal is less than 9 months, then the netting proposal is likely to be approved.

First, the netting engine determines that the total number of invoices in the new netting proposal, 356, is within the range corresponding to a netting proposal which is likely to be approved, because 356 is within the attribute value range <850. Next, the netting engine determines that the total value of the invoices and the average age of the invoices are each within the range of attribute values corresponding to a netting proposal which is likely to be approved.

The new netting proposal is likely to be approved, based on the attribute values. The netting engine presents the new netting proposal to the trading partners involved, for approval.

Upon each trading partner's approval or rejection of the netting proposal, the netting engine uses netting proposal data comprising trading partner attribute values, invoice attribute values, netting proposal attribute values, and the decision to approve or reject, to train the machine learning model, as described below in Section 4.2.

4.2 Machine Learning Model

In an embodiment, the netting engine uses a machine learning model to establish attribute characteristics associated with prior approved or rejected netting proposals. The machine learning model may be a decision-tree-based model.

In an embodiment, the netting engine uses the machine learning model to rank attributes based on a correlation between each attribute and an approval rate, or rejection rate, of prior netting proposals. The netting engine may determine which attributes are a strong indicator of the success or failure of a netting proposal. A weighting may be used to rank the attributes, so that attributes with a greater impact on the likelihood of approval of a netting proposal are weighted more heavily. For example, in prior netting proposals, invoices have been approved frequently, regardless of the invoice amount, if the invoice would receive a discount of more than 30%. Because the discount attribute is a strong indicator of approval, the discount attribute is given a high weight.

The machine learning model may be used to establish a weighting based on the interrelation of two or more attributes. For example, in the United States, the cumulative age of invoices has the most influence on whether a netting proposal is accepted or rejected. In the United Kingdom, the average amount of invoices has the most influence on whether a netting proposal is accepted or rejected. The cumulative age of invoices is weighted heavily in the United States. The average amount of invoices is weighted heavily in the United Kingdom.

In an embodiment, the machine learning model includes a function describing the likelihood of a netting proposal, comprising a particular combination of attribute characteristics, being approved. For example, the netting engine evaluates each of three trading partner attributes in turn. The netting engine determines that the approval history of a particular trading partner is strongly, and positively, correlated with the approval of prior netting proposals including that trading partner. The netting engine assigns approval history a weighting of +20. The netting engine determines that accounts payable strongly, and negatively, correlates with the approval history of prior netting proposals. The netting engine assigns accounts payable a weight of −11. The weight is negative because the higher a trading partner's accounts payable value is, the less likely other trading partners are likely to approve netting proposals including that trading partner. Including the location North Korea always results in rejected netting proposals, while other locations do not correlate more than a marginal amount with netting proposal acceptance or rejection. The location attribute is represented as a step function, S, which is equal 0 if the trading partner is located in North Korea, and 1 otherwise.

The Netting Engine Generates the Function $$L = S\left[-11\left(\frac{AP(tp)}{AP(av)}\right) + 20AH\right],$$

where L is the likelihood of approval of the netting proposal, S is the location step function, AP(tp) is the accounts payable of a trading partner, AP(av) is the average accounts payable for a set of trading partners, and AH is the percentage of approved netting proposals for the trading partner.

In an embodiment, the netting engine assigns weights to prior netting proposals based on a number of attributes shared with a new netting proposal. For example, a new netting proposal includes attributes A, B, C, D, and E. The netting engine identifies five prior netting proposals (PNPs) that include at least one attribute in the new netting proposal. PNP 1 was rejected, and includes attributes B and C. PNP 2 was accepted, and includes attributes A, D, and E. PNP 3 was rejected, and includes attributes A and C. PNP 4 was accepted, and includes attributes A, B, C, and D. PNP 5 was accepted, and includes attributes D and E. Each prior netting proposal is weighted based on the formula $$W = A\frac{N_P}{N_T}$$

W is a weighting factor between 0 and 1. A is an acceptance or rejection parameter. A is equal to 1 if the prior netting proposal was accepted and 0 if the prior netting proposal was rejected. $N_P$ is the number of attributes common between the new netting proposal and the set of prior netting proposals. $N_T$ is the number of attributes common between the new netting proposal and the prior netting proposal.

For the five PNPs above, the total number of attributes in common, $N_T$, is 2+3+2+4+2=13. For PNP 1, the weighting is 0 (2/13)=0. For PNP 2, the weighting is 1(3/13)=0.23. For PNP 3, the weighting is 0(2/13)=0. For PNP 4, the weighting is 1(4/13)=0.31. For PNP 5, the weighting is 1(2/13)=0.15. The netting engine may use a prior netting proposal if the weighting exceeds a particular value, such as 0.5.

At an initial time, the machine learning model may be trained with stored data. Attribute values may be obtained using anonymized data from an invoice management system. To obtain decision information, a set of users may be enrolled in a beta test. The system generates netting proposals for the users to accept or reject. The acceptance or rejection can be used to generate data to train the model. In beta testing, the netting proposals need not necessarily be implemented. Beta users may review netting proposals, make a decision to accept or reject, and explain reasoning for the decision.

Once initial training of the machine learning model is complete, each new netting proposal may be used to further train and refine the machine learning model. Each time a netting proposal is generated and the trading partners involved accept or reject the netting proposal, the information may be fed to the machine learning model. Continually feeding information to the machine learning model will train the model and improve future models of what combination of attribute values make a netting proposal more lily to be accepted than rejected.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
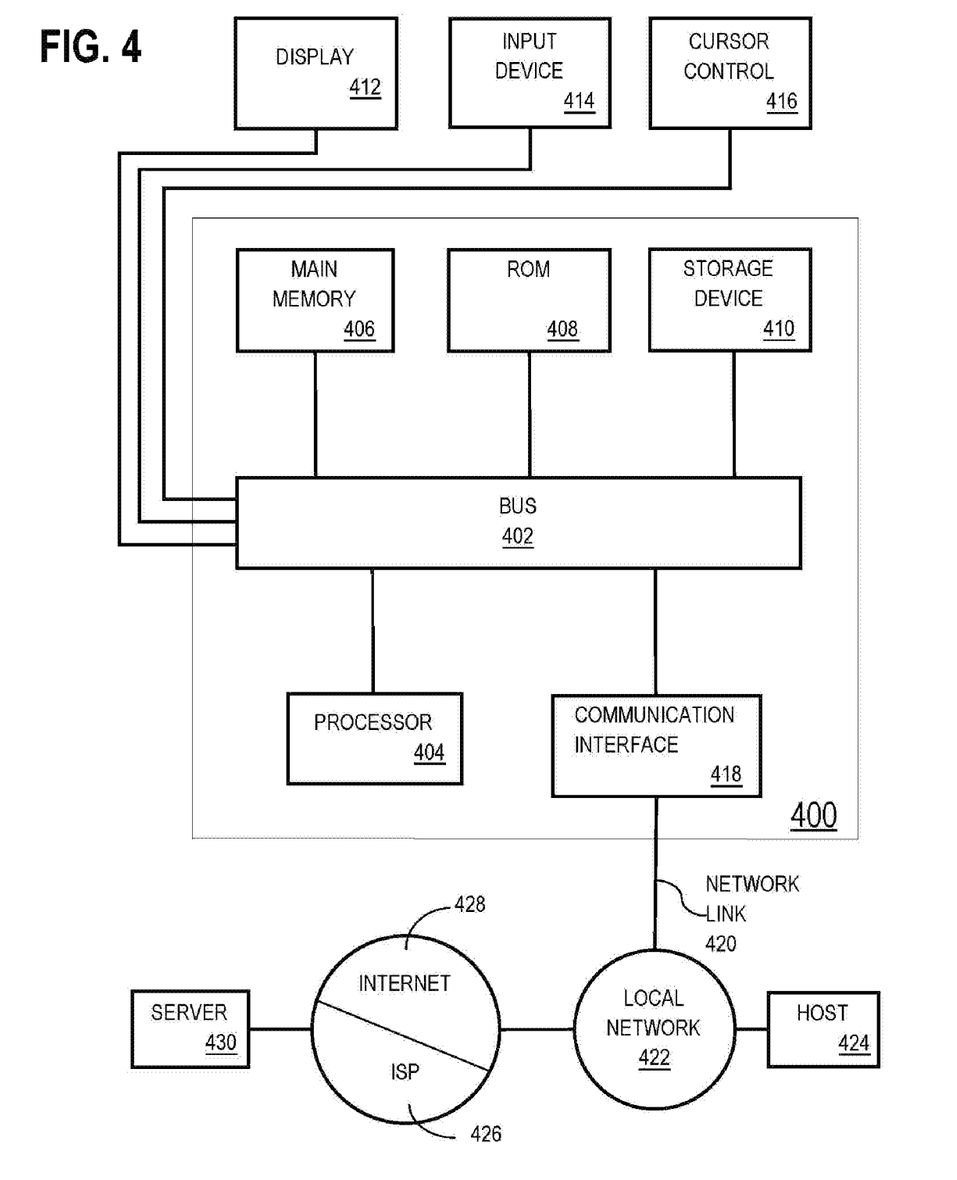
FIG. 4 illustrates a block diagram of a system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
training a machine learning model to identify one or more netting proposals applicable to a plurality of trading partners by:
obtaining historical data comprising a first plurality of prior netting proposals, each of the of prior netting proposals in the first plurality (a) defining values for a corresponding set of attributes and (b) being associated with a corresponding set of prior invoices;
generating a first model training data set comprising (a) the first plurality of prior netting proposals and (b) information indicating whether each of the prior netting proposals in the first plurality were accepted or rejected by one or more of the plurality of trading partners;
training the machine learning model using one or more hardware processors, the training based on the first model training data set to obtain a first netting proposal recognition model;
performing additional training of the first netting proposal recognition model to obtain an updated netting proposal recognition model, the additional training being based on a second plurality of prior netting proposals, wherein each particular netting proposal of the second plurality of prior netting proposals (a) defines corresponding attributes, (b) is associated with a corresponding set of invoices, and (c) includes information indicating whether the particular netting proposal was accepted or rejected by one or more of the plurality of trading partners;
applying the updated netting proposal recognition model to a plurality of invoices to determine a target netting proposal,
wherein the target netting proposal reduces both an accounts receivable amount and an accounts payable amount for a first trading partner of the plurality of trading partners,
wherein applying the updated netting proposal recognition model comprises:
selecting at least a subset of the plurality of invoices associated with at least a subset of the plurality of trading partners for inclusion in the target netting proposal based (a) on one or more characteristics of the subset of the plurality of invoices and (b) the values of the attributes of one or more of the first or second plurality of prior netting proposals that have been rejected or accepted by one or more of the subset of the plurality of trading partners;
generating, by the updated netting proposal recognition model, the target netting proposal for the selected subset of the plurality of invoices associated with the subset of the plurality of trading partners;
presenting the target netting proposal to the first trading partner for rejection or approval;
receiving a rejection or an approval of the presented target netting proposal; and
updating the training data set by adding the target netting proposal and the associated rejection or approval.

2. The medium of claim 1, wherein the accounts receivable amount comprises a first amount due to the first trading partner from a second trading partner of the plurality of trading partners, and wherein the accounts payable amount comprises a second amount owed by the first trading partner to a third trading partner of the plurality of trading partners, wherein the second trading partner is different from the third trading partner.

3. The medium of claim 1, wherein the accounts receivable amount comprises a first amount due to the first trading partner from a second trading partner of the plurality of trading partners, and wherein the accounts payable amount comprises a second amount owed by the first trading partner to the second trading partner.

4. The medium of claim 1, wherein the target netting proposal comprises an amount to reduce from both the accounts receivable amount and the accounts payable amount for the first trading partner, and at least one of the values of the attributes is a range that includes the amount.

5. The medium of claim 1, further comprising selecting one or more transactions from the subset of the plurality of invoices to include in the target netting proposal.

6. The medium of claim 1, wherein the one or more characteristics of the plurality of invoices comprises a type of goods or services corresponding to a transaction.

7. The medium of claim 1, wherein the one or more characteristics of the plurality of invoices comprises a location corresponding to a trading partner.

8. The medium of claim 1, wherein the one or more characteristics of the plurality of invoices comprises a number of transactions.

9. The medium of claim 1, wherein the one or more characteristics of the plurality of invoices comprises characteristics of a second trading partner.

10. The medium of claim 1, wherein the one or more characteristics of the plurality of invoices is not associated with any attribute of the first or second the plurality of prior netting proposals rejected by one or more of the plurality of trading partners.

11. The medium of claim 1, wherein applying the updated netting proposal recognition model model comprises determining a likelihood of the target netting proposal being accepted or rejected by the first trading partner, the applying further comprising:
assigning a weight to each netting proposal of the first and second pluralities of prior netting proposals that share at least one characteristic with the target netting proposal, the assigned weight based on a number of characteristics shared with the target netting proposal.

12. The medium of claim 1, wherein the selection of the subset of the plurality of invoices for inclusion in the target netting proposal is based on:
one or more characteristics of the plurality of invoices being associated with at least one attribute of one or more netting proposal of the first and second pluralities of prior netting proposals that was approved by one or more of the trading partners; or
one or more characteristics of the plurality of invoices being associated with any attribute of any netting proposal of the first and second pluralities of prior netting proposals that was rejected by one or more of the trading partners.

13. The medium of claim 1, wherein the selection of the subset of the plurality of invoices for inclusion in the target netting proposal is based on:
one or more characteristics of the plurality of invoices being associated with at least one attribute of one or more netting proposal of the first and second pluralities of prior netting proposals with an approval rate that meets a first threshold value; or one or more characteristics of the plurality of invoices not being associated with any attribute of any of the first and second pluralities of prior netting proposals with a rejection rate that meets a second threshold value.

14. The medium of claim 1, wherein the operations further comprise:

ranking a plurality of characteristics of the plurality of invoices based on a correlation between each particular characteristic and an approval rate of a subset of netting proposals of the first and second pluralities of prior netting proposals with the particular attribute; and selecting the subset of the plurality of invoices based, in part, on the rank of the characteristics.

15. The medium of claim 1, wherein the machine learning model comprises a decision-tree based machine learning model.

16. A system comprising:

at least one device including a hardware processor;

the system configured to perform operations comprising:

training a machine learning model to identify one or more netting proposals applicable to a plurality of trading partners by:

obtaining historical data comprising a first plurality of prior netting proposals, each of the of prior netting proposals in the first plurality (a) defining values for a corresponding set of attributes and (b) being associated with a corresponding set of prior invoices;

generating a first model training data set comprising (a) the first plurality of prior netting proposals and (b) information indicating whether each of the prior netting proposals in the first plurality were accepted or rejected by one or more of the plurality of trading partners;

training the machine learning model using one or more hardware processors, the training based on the first model training data set to obtain a first netting proposal recognition model;

performing additional training of the first netting proposal recognition model to obtain an updated netting proposal recognition model, the additional training being based on a second plurality of prior netting proposals, wherein each particular netting proposal of the second plurality of prior netting proposals (a) defines corresponding attributes, (b) is associated with a corresponding set of invoices, and (c) includes information indicating whether the particular netting proposal was accepted or rejected by one or more of the plurality of trading partners;

applying the updated netting proposal recognition model to a plurality of invoices to determine a target netting proposal, wherein the target netting proposal reduces both an accounts receivable amount and an accounts payable amount for a first trading partner of the plurality of trading partners, wherein applying the updated netting proposal recognition model comprises:

selecting at least a subset of the plurality of invoices associated with at least a subset of the plurality of trading partners for inclusion in the target netting proposal based on (a) one or more characteristics of the plurality of invoices and (b) the values of the attributes of one or more of the first or second plurality of prior netting proposals that have been rejected or accepted by one or more of the subset of the plurality of trading partners;

generating, by the updated netting proposal recognition model, the target netting proposal for the selected subset of the plurality of invoices associated with the subset of the plurality of trading partners; and presenting the target netting proposal to the first trading partner for rejection or approval.

17. A method comprising:

training a machine learning model to identify one or more netting proposals applicable to a plurality of trading partners by:

obtaining historical data comprising a first plurality of prior netting proposals, each of the plurality of prior netting proposals in the first plurality (a) defining values for a corresponding set of attributes and (b) being associated with a corresponding set of prior invoices;

generating a first model training data set comprising (a) the first plurality of prior netting proposals and (b) information indicating whether each of the prior netting proposals in the first plurality were accepted or rejected by one or more of the plurality of trading partners;

training the machine learning model using one or more hardware processors, the training based on the first model training data set to obtain a first netting proposal recognition model;

performing additional training of the first netting proposal recognition model to obtain an updated netting proposal recognition model, the additional training being based on a second plurality of prior netting proposals, wherein each particular netting proposal of the second plurality of prior netting proposals (a) defines corresponding attributes, (b) is associated with a corresponding set of invoices, and (c) includes information indicating whether the particular netting proposal was accepted or rejected by one or more of the plurality of trading partners;

applying the updated netting proposal recognition model to a plurality of invoices to determine a target netting proposal, wherein the target netting proposal reduces both an accounts receivable amount and an accounts payable amount for a first trading partner of the plurality of trading partners, wherein applying the updated netting proposal recognition model comprises:

selecting at least a subset of the plurality of invoices associated with at least a subset of the plurality of trading partners for inclusion in the target netting proposal based (a) on one or more characteristics of the plurality of invoices and (b) the values of the attributes of one or more of the first or second plurality of prior netting proposals that have been rejected or accepted by one or more of the subset of the plurality of trading partners;

generating, by the updated netting proposal recognition model, the target netting proposal for the selected subset of the plurality of invoices associated with the subset of the plurality of trading partners; and presenting the target netting proposal to the first trading partner for rejection or approval, wherein the method is performed by at least one device including a hardware processor.

* * * * *

UNITED STATES PATENT AND TRADEMARK OFFICE
CERTIFICATE OF CORRECTION

| | |
|---|---|
| PATENT NO. | : 11,276,117 B2 |
| APPLICATION NO. | : 15/665385 |
| DATED | : March 15, 2022 |
| INVENTOR(S) | : Haimes |

It is certified that error appears in the above-identified patent and that said Letters Patent is hereby corrected as shown below:

In the Specification

In Column 9, Lines 43-44, delete "$L=-9\,(N_i)+8\,(D_t)$," and insert -- $L=-9\,(N_i)+8\,(D_t)$, --, therefor.

In the Claims

In Column 17, Line 15, in Claim 1, delete "of prior" and insert -- prior --, therefor.

In Column 18, Line 37, in Claim 10, delete "second the" and insert -- second --, therefor.

In Column 18, Line 41, in Claim 11, delete "model model" and insert -- model --, therefor.

In Column 19, Line 28, in Claim 16, delete "of prior" and insert -- prior --, therefor.

In Column 20, Line 17, in Claim 17, delete "plurality of prior" and insert -- prior --, therefor.

Signed and Sealed this
Thirtieth Day of August, 2022

Katherine Kelly Vidal
*Director of the United States Patent and Trademark Office*